United States Patent
Moertl et al.

(10) Patent No.: US 6,957,293 B2
(45) Date of Patent: Oct. 18, 2005

(54) SPLIT COMPLETION PERFORMANCE OF PCI-X BRIDGES BASED ON DATA TRANSFER AMOUNT

(75) Inventors: Daniel Frank Moertl, Rochester, MN (US); Adalberto Guillermo Yanes, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 396 days.

(21) Appl. No.: 10/122,989

(22) Filed: Apr. 15, 2002

(65) Prior Publication Data

US 2003/0196019 A1 Oct. 16, 2003

(51) Int. Cl.[7] .............................................. G06F 13/36
(52) U.S. Cl. ...................... 710/310; 710/313; 710/314; 710/53; 710/34; 710/35
(58) Field of Search ................................ 710/305–317, 710/52–57, 33–35, 39, 22–27, 29

(56) References Cited

U.S. PATENT DOCUMENTS

| | | | | |
|---|---|---|---|---|
| 6,026,451 | A * | 2/2000 | Sreenivas | 710/39 |
| 6,058,450 | A | 5/2000 | LaBerge | |
| 6,260,095 | B1 * | 7/2001 | Goodrum | 710/310 |
| 6,418,494 | B1 | 7/2002 | Shatas et al. | |
| 6,425,024 | B1 * | 7/2002 | Kelley et al. | 710/56 |
| 6,546,447 | B1 | 4/2003 | Buckland et al. | |
| 6,557,068 | B2 * | 4/2003 | Riley et al. | 710/306 |
| 6,578,102 | B1 * | 6/2003 | Batchelor et al. | 710/310 |
| 6,581,129 | B1 * | 6/2003 | Buckland et al. | 710/306 |
| 6,594,722 | B1 | 7/2003 | Willke, II et al. | |
| 6,615,295 | B2 | 9/2003 | Shah | |
| 6,647,454 | B1 * | 11/2003 | Solomon | 710/310 |
| 6,694,397 | B2 * | 2/2004 | Lackey et al. | 710/112 |
| 6,760,791 | B1 | 7/2004 | Askar | |
| 6,760,792 | B1 * | 7/2004 | Askar | 710/52 |
| 2002/0184428 | A1 * | 12/2002 | Bennett et al. | 710/310 |
| 2004/0225774 | A1 * | 11/2004 | Shah et al. | 710/200 |

OTHER PUBLICATIONS

U.S. Appl. No. 10/122,993, filed Apr. 15, 2002, entitled "Data Forwarding by Host/PCI-X Bridges".

* cited by examiner

*Primary Examiner*—Paul R. Myers
*Assistant Examiner*—Raymond N Phan
(74) *Attorney, Agent, or Firm*—Moser, Patterson & Sheridan, LLP

(57) ABSTRACT

Embodiments are provided in which a method is described for transferring data in a digital system including a first bus, a second bus, a PCI-X bridge coupling the first and second buses, and a first device and a second device residing on the first and second buses, respectively. The first bus has the same or higher bandwidth than that of the second bus. According to the method, the PCI-X bridge immediately starts or resumes forwarding split completion data from the first device to the second device if the first device starts or resumes split completion data transfer to the PCI-X bridge at the beginning of a block (i.e., the start or resume byte address has the form of 128N). If the first device starts transfer to the PCI-X bridge not at the beginning of a block, the PCI-X bridge refrains from forwarding split completion data until (a) the first device sends the data byte at the beginning of the next block to the PCI-X bridge or (b) the byte transfer count is exhausted, whichever occurs first.

23 Claims, 4 Drawing Sheets

SPLIT COMPLETION PERFORMANCE OF PCI-X BRIDGES BASED ON DATA TRANSFER AMOUNT

BACKGROUND OF THE INVENTION

1. Field of the Invention

The present invention generally relates to PCI-X (Peripheral Component Interconnect-X) bridges, and more particularly to performance of PCI-X bridges in forwarding split completion data.

2. Description of the Related Art

In a conventional computer system, a PCI-X bridge couples a first bus to a second bus. The first bus may be a PCI-X bus, a PCI bus, or a Front Side Bus (FSB). The second bus may be a PCI-X bus or a PCI bus. The first bus is a FSB if it is coupled to at least a processor. In that case, the PCI-X bridge is called a Host/PCI-X bridge.

Assume the PCI-X bridge in the conventional computer system couples a first PCI-X bus to a second PCI-X bus. Assume further that a first PCI-X device and a second PCI-X device reside on the first and second PCI-X buses, respectively. Assume further that the first PCI-X device on the first PCI-X bus initiates a block read transaction to read data from the second PCI-X device on the second PCI-X bus. Because the first and second PCI-X devices must communicate via the PCI-X bridge, the transaction must be carried out as a split transaction. A split transaction consists of a request by a requester followed by a completion by a completer at a later time.

As a requester, the first PCI-X device sends a read request to the PCI-X bridge via the first PCI-X bus. The read request is called a split read request. The PCI-X bridge responds by sending back a split read response to the first PCI-X device on the first PCI-X bus. The PCI-X bridge then reinitiates the split read request to the second PCI-X device via the second PCI-X bus. Assume the second PCI-X device needs time to gather the requested data from its memory, the second PCI-X device responds to the split read request from the PCI-X bridge by sending back a split read response to the PCI-X bridge. At a later time, when the second PCI-X device has gathered all the requested data (called split completion data), the second PCI-X device sends the split completion data to the PCI-X bridge via the second PCI-X bus. Finally, the PCI-X bridge sends the split completion data to the first PCI-X device via the first PCI-X bus.

The mechanism used by the PCI-X bridge to forward the split completion data to the first PCI-X device on the first PCI-X bus has a large impact on the efficiency and latency of the computer system. Latency is defined as the time period from the time a data item is sent from a source to the time the data item is received at a destination. Efficiency of a system can be defined as how well the system's resources are used. A system operating with high efficiency means that a high percentage of the system's resources are used for the ultimate purposes of those resources, and without unnecessary overhead. For example, in the case of a bus, the system operates with high efficiency if a high percentage of the bus bandwidth is used for transferring data (which is the ultimate purpose of a bus). If a large percentage of the bus bandwidth is not used for transferring data (for instance, the bus is idle), the system operates with low efficiency. However, efficiency and latency are two competing goals in conventional computer systems.

Assume, in a first scenario, that the PCI-X bridge delivers split completion data from the second PCI-X device to the first PCI-X device only when the PCI-X bridge receives all the split completion data from the second PCI-X device. In this case, high efficiency can be achieved because the PCI-X bridge can forward all the split completion data to the first PCI-X device in one burst (i.e., no bus idling occurs from the beginning to the end of the forwarding of all the split completion data). However, a drawback is high latency because the first split completion data item must wait for the last split completion data item to come to the PCI-X bridge before the first split completion data item is delivered to the first PCI-X device on the first PCI-X bus.

Assume alternatively, in a second scenario, that the PCI-X bridge delivers split completion data from the second PCI-X device to the first PCI-X device when the PCI-X bridge receives less than all the split completion data from the second PCI-X device. In this case, lower latency is achieved compared with the case in the first scenario. However, a drawback is lower efficiency because the PCI-X bridge may run out of split completion data and has to disconnect at the next ADB (Allowable Disconnect Boundary). At a later time, when the PCI-X bridge receives more split completion data from the second PCI-X device, the PCI-X bridge delivers the next burst of split completion data to the first PCI-X device. Therefore, the PCI-X bridge may have to forward the split completion data to the first PCI-X device in one or more bursts with the first PCI-X bus being idle between these bursts, resulting in lower efficiency.

Accordingly, there is a need for an apparatus and method in which a PCI-X bridge forwards split completion data from one PCI-X device to another with relatively low latency and relatively high efficiency.

SUMMARY OF THE INVENTION

In one embodiment, a method is described for transferring data in a digital system including a first bus, a second bus, and a bridge coupling the first and second buses. The first bus has the same or higher bandwidth than that of the second bus. The method comprises (a) transferring data from the first bus to the bridge, (b) determining, with the bridge, whether the bridge will receive at least a predetermined data amount from the first bus while transferring data from the first bus to the bridge, and (c) forwarding, with the bridge, data from the first bus to the second bus in response to the bridge determining that the bridge will receive at least the predetermined data amount from the first bus.

In another embodiment, a digital system for transferring data is described. The system comprises a first bus, a second bus, and a bridge coupling the first and second buses. The first bus has the same or higher bandwidth than that of the second bus. The digital system is configured to transfer data from the first bus to the bridge. The bridge is configured to determine whether the bridge will receive at least a predetermined data amount from the first bus while data is being transferred from the first bus to the bridge. The bridge is further configured to forward data from the first bus to the second bus in response to the bridge determining that the bridge will receive at least the predetermined data amount from the first bus.

In yet another embodiment, a method is described for transferring data in a digital system including a first bus, a second bus, and a bridge coupling the first and second buses. The method comprises (a) configuring the bridge with a positive integer N, N being at least the block size and determined based on system information of the digital system, (b) if N is the block size, determining, with the bridge, whether the transfer of data from the first bus to the bridge reaches the beginning of a block while transferring data from the first bus to the bridge, and (c) forwarding, with the bridge, data from the first bus to the second bus in response to the bridge determining that the transfer of data from the first bus to the bridge reaches the beginning of a block.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments are provided in which a method is described for transferring data in a digital system including a first bus, a second bus, a PCI-X bridge coupling the first and second buses, and a first device and a second device residing on the first and second buses, respectively. The first bus has the same or higher bandwidth than that of the second bus. According to the method, the PCI-X bridge immediately starts or resumes forwarding split completion data from the first device to the second device if the first device starts or resumes split completion data transfer to the PCI-X bridge at the beginning of a block (i.e., the start or resume byte address has the form of 128N). If the first device starts split completion data transfer to the PCI-X bridge not at the beginning of a block, the PCI-X bridge refrains from forwarding split completion data until (a) the first device sends the data byte at the beginning of the next block to the PCI-X bridge or (b) the byte transfer count is exhausted, whichever occurs first.

Figure 1:
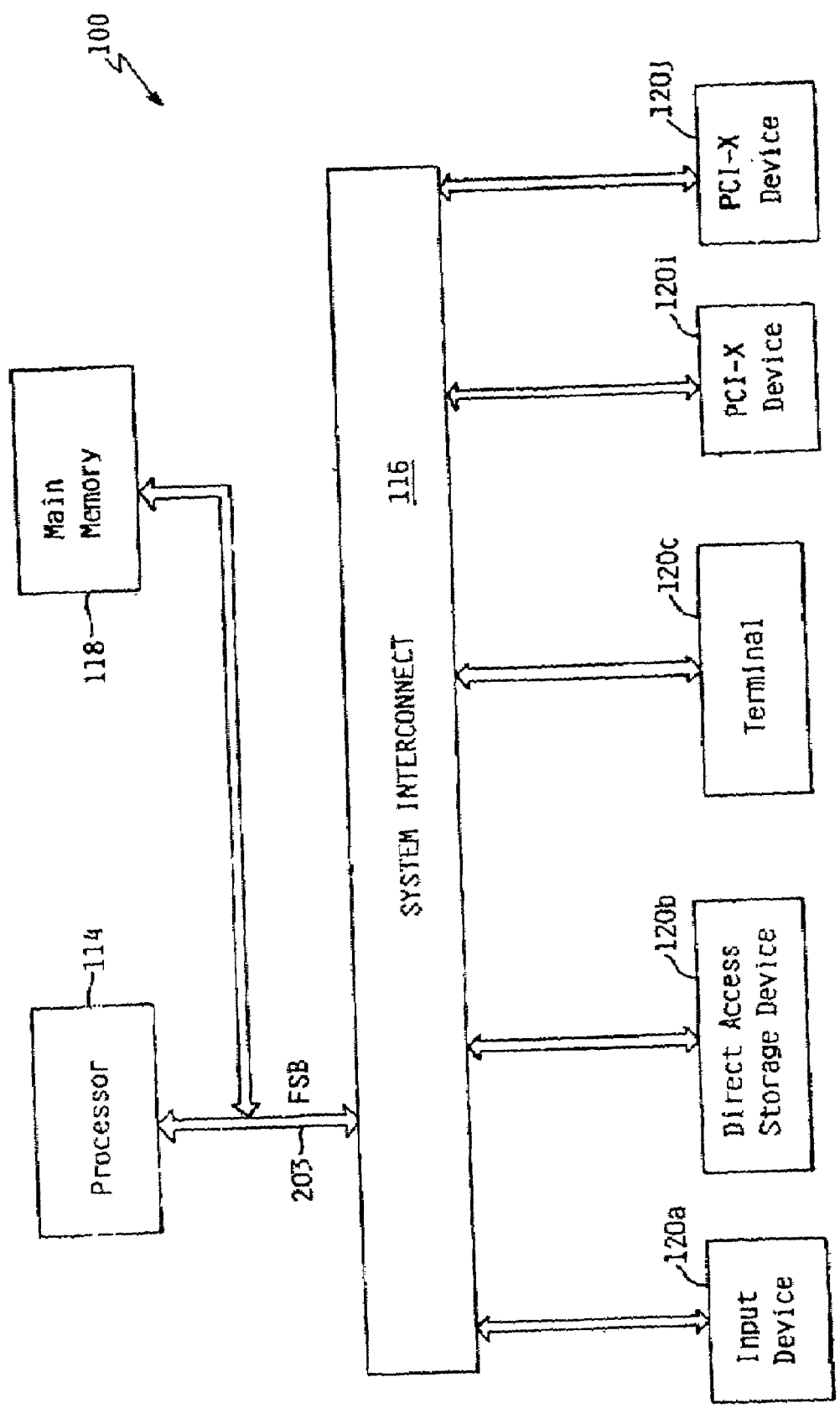
FIG. 1 is a computer system 100 according to one embodiment.

FIG. 1 is a computer system 100 according to an embodiment. Illustratively, the computer system 100 includes a system interconnect 116. The computer system 100 also includes, illustratively, at least a processor 114, a main memory 118, an input device 120a, a storage device 120b, a terminal 120c, and PCI-X devices 120i and 120j (collectively, PCI-X devices 120); all coupled to the system interconnect 116. The processor 114 and the main memory 118 are coupled to the system interconnect 116 via a Front Side Bus (FSB) 203.

The PCI-X devices 120i and 120j may be any devices that transfer data and control signals with other devices via the system interconnect 116 according to the PCI-X specification. Terminal 120c is any display device such as a cathode ray tube (CRT) or a plasma screen. Terminal 120c may also be desktop or PC-based computers, workstations, network terminals, or other networked computer systems. Input device 120a can be any device to give input to the computer system 100. For example, a keyboard, keypad, light pen, touch screen, button, mouse, track ball, or speech recognition unit could be used. Further, although shown separately, the terminal 120c and the input device 120a could be combined. For example, a display screen with an integrated touch screen, a display with an integrated keyboard or a speech recognition unit combined with a text speech converter could be used.

Storage device 120b is DASD (Direct Access Storage Device), although it could be any other storage such as floppy disc drives or optical storage. Although storage 120b is shown as a single unit, it could be any combination of fixed and/or removable storage devices, such as fixed disc drives, floppy disc drives, tape drives, removable memory cards, or optical storage. Main memory 118 and storage device 120b could be part of one virtual address space spanning multiple primary and secondary storage devices.

The contents of main memory 118 can be loaded from and stored to the storage device 120b as the processor 114 has a need for it. Main memory 118 is any memory device sufficiently large to hold the necessary programming and data structures of the invention. The main memory 118 could be one or a combination of memory devices, including random access memory (RAM), non-volatile or backup memory such as programmable or flash memory or read-only memory (ROM). The main memory 118 may be physically located in another part of the computer system 100. While main memory 118 is shown as a single entity, it should be understood that memory 118 may in fact comprise a plurality of modules, and that main memory 118 may exist at multiple levels, from high speed to low speed memory devices.

Figure 2:
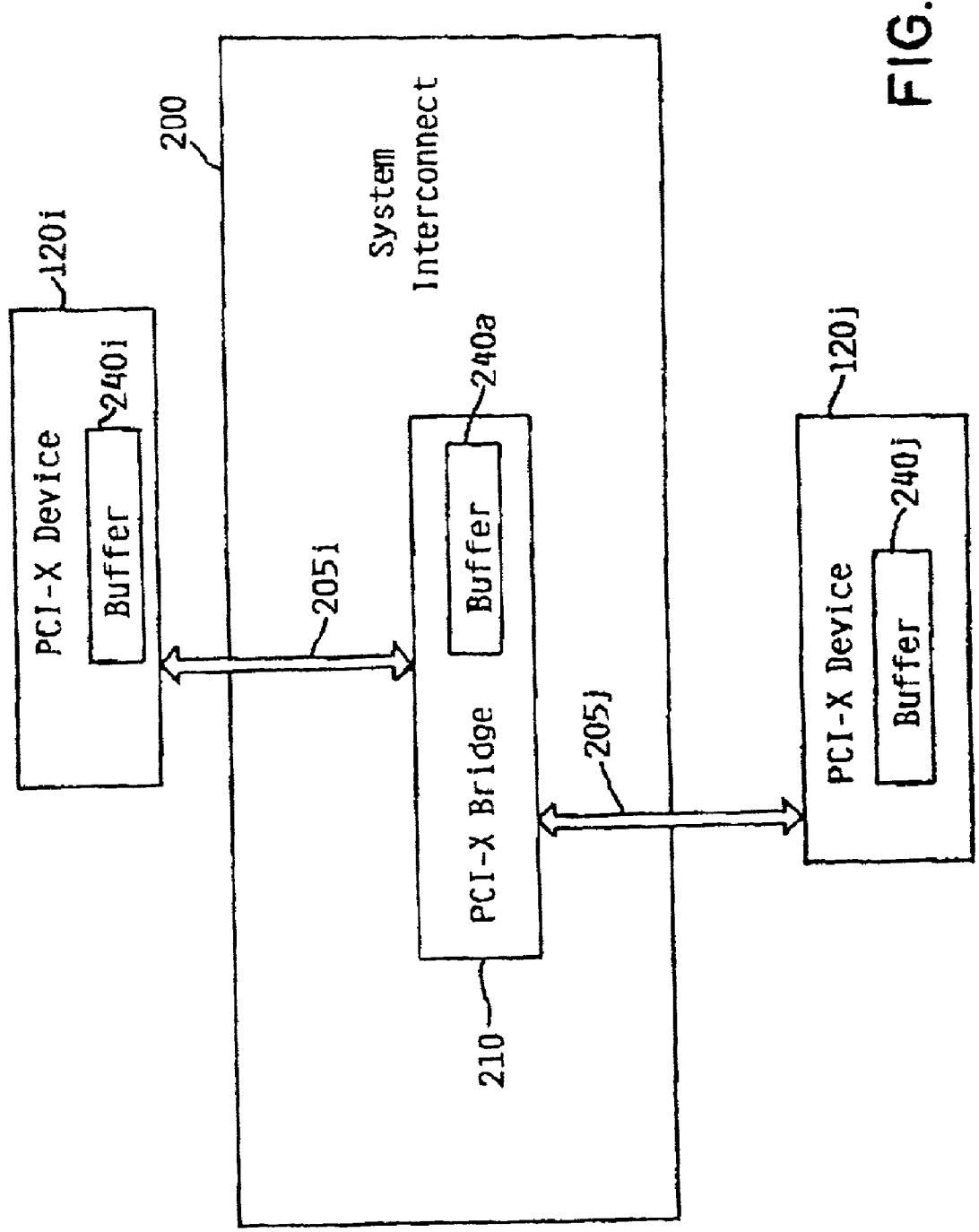
FIG. 2 shows a system interconnect 200 as an embodiment of the system interconnect 116 of FIG. 1.

FIG. 2 shows a system interconnect 200 as an embodiment of the system interconnect 116 of FIG. 1. Illustratively, the system interconnect 200 includes a PCI-X bridge 210 coupled to the PCI-X device 120i via a PCI-X bus 205i. The PCI-X bridge 210 is also coupled to the PCI-X device 120j via a PCI-X bus 205j. The PCI-X bridge 210 includes, illustratively, a buffer 240a. The PCI-X devices 120i and 120j includes, illustratively, buffers 240i and 240j, respectively. The buffers 240a, 240i, and 240j are used for temporarily storing split completion data from the PCI-X device 120i to be forwarded by the PCI-X bridge 210 to the PCI-X device 120j. More specifically, the buffer 240i is used for temporarily storing split completion data generated by the PCI-X device 120i. The buffer 240a is used for temporarily storing split completion data received from the PCI-X device 120i. The buffer 240j is used for temporarily storing split completion data forwarded from the PCI-X bridge 210.

According to the PCI-X specification, address space is divided into 128-byte blocks. For instance, addresses 0d (decimal)-127d constitutes a block. Addresses 128d–255d constitutes another block, and so on. The end of a block is called an ADB (Allowable Disconnect Boundary). For instance, there is an ADB between addresses 127d and 128d. There is another ADD between addresses 255d and 256d. In general, there is an ADB between addresses 128N−1 and 128N, where N≧1. According to the PCI-X specification, transfers between an initiator and a target can be disconnected by either the initiator or the target only at the next ADB. One exception to this is when the byte transfer count is exhausted. For example, if an initiator is transferring data from addresses 0d–130d (i.e., 131 bytes needs to be transferred) to a target, either the initiator or the target can disconnect immediately after the byte from address 127d is transferred to the target. Later, the initiator can transfer the remaining three bytes from addresses 128*d*, 129*d*, and 130*d* to the target. The transfer is then disconnected immediately after address 130*d*, which is not an ADB. This is allowed because the byte transfer count that started at 131*d* is exhausted (decreased to zero) immediately after the byte at address 130*d* is transferred to the target. In other words, the exception case is applicable here.

In one embodiment, the bandwidth of the PCI-X bus 205*i* is the same as or higher than that of the PCI-X bus 205*j*. For illustration of the operation of the PCI-X bridge 210, assume that the PCI-X device 120*j* on the PCI-X bus 205*j* initiates a block read transaction to read data from the PCI-X device 120*i* on the PCI-X bus 205*i*. Because the PCI-X devices 120*i* and 120*j* must communicate via the PCI-X bridge 210, the block read transaction must be carried out as a split transaction. The PCI-X device 120*j* starts the split transaction by sending a split read request to the PCI-X bridge 210 via the PCI-X bus 205*j*. The PCI-X bridge 210 responds by sending back a split read response to the PCI-X device 120*j* on the PCI-X bus 205*j*. The PCI-X bridge 210 then reinitiates the split read request to the PCI-X device 120*i* via the PCI-X bus 205*i*. Assuming the PCI-X device 120*i* needs time to gather the requested data, the PCI-X device 120*i* responds to the split read request from the PCI-X bridge 210 by sending back a split read response to the PCI-X bridge 210. At a later time, when the PCI-X device 120*i* has gathered some or all the requested data (called split completion data), the PCI-X device 120*i* sends the split completion data to the PCI-X bridge 210 via the PCI-X bus 205*i*.

In one embodiment, the PCI-X bridge 210 forwards split completion data from the PCI-X device 120*i* to the PCI-X device 120*j* according to the following rule. The PCI-X bridge 210 immediately starts or resumes forwarding split completion data to the PCI-X device 120*j* if the PCI-X device 120*i* starts or resumes split completion data transfer at the beginning of a block (i.e., the start or resume byte address has the form of 128N). If the PCI-X device 120*i* starts split completion data transfer not at the beginning of a block, the PCI-X bridge 210 refrains from forwarding split completion data until (a) the PCI-X device 120*i* sends the data byte at the beginning of the next block to the PCI-X bridge 210 or (b) the byte transfer count is exhausted, whichever occurs first.

Figure 3:
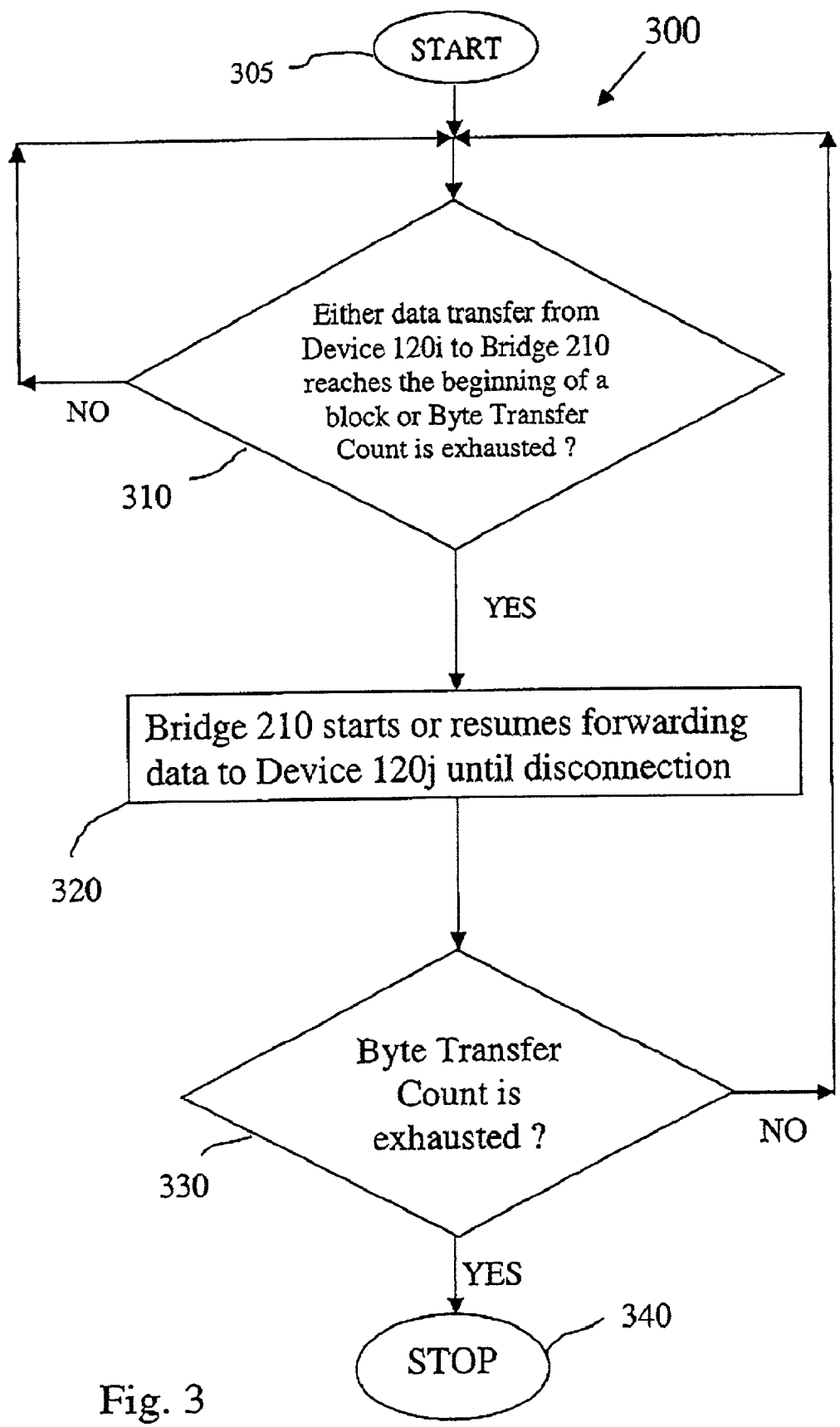
FIG. 3 shows one embodiment of a method of operation 300 of the PCI-X bridge 210 of FIG. 2 in forwarding split completion data.

FIG. 3 shows one embodiment of a method of operation 300 of the PCI-X bridge 210 of FIG. 2 in forwarding split completion data from the PCI-X device 120*i* to the PCI-X device 120*j*. The method 300 starts with a step 305. In step 310, while the PCI-X bridge 210 is receiving split completion data from the PCI-X device 120*i*, a first determination is made as to whether the split completion data transfer from the PCI-X the PCI-X device 120*i* to the PCI-X bridge 210 reaches the beginning of a block. Also in the step 310, a second determination is made as to whether the byte transfer count for the data transfer between the PCI-X device 120*i* and the PCI-X bridge 210 is exhausted. If both the first and second determinations yield negative (NO) results, the step 310 is repeated. If either the first or second determinations yield a positive (YES) result, in a step 320, the PCI-X bridge 210 starts forwarding split completion data from the PCI-X device 1201 to the PCI-X device 120*j* until a disconnection occurs between the PCI-X bridge 210 and the PCI-X device 120*j*. The method 300 continues with a step 330 in which a third determination is made as to whether the byte transfer count for the data transfer between the PGI-X bridge 210 and the PCI-X device 120*j* is exhausted. If so, the split completion data transfer between the PCI-X bridge 210 and the PCI-X device 120*j* is complete in a step 340. If not, the disconnection in the step 320 is a disconnection at an ADB and is a result of a disconnection at an ADB in the data transfer between the PCI-X device 120i and the PCI-X bridge 210. As a result, the step 310 is repeated. When the PCI-X device 120*i* resumes sending split completion data to the PCI-X bridge 210 at the beginning of the next block, the first determination in the step 310 yields a positive (YES) result. In response, in the step 320, the PCI-X bridge resumes forwarding split completion data from the PCI-X device 120*i* to the PCI-X device 120*j*.

As a first example illustrating the operation of the PCI-X bridge 210, assume that before sending split completion data to the PCI-X bridge 210, the PCI-X device 120*i* indicates that it will start at the beginning of a block and the byte transfer count is 300*d* (i.e., the PCI-X device 120*i* will send 300 bytes). Because the PCI-X device 120*i* starts at the beginning of a block (at step 310 with a result of YES for the first determination), as soon as the PCI-X bridge 210 receives the first data byte of split completion data stream from the PCI-X device 120*i*, the PCI-X bridge 210 starts forwarding the split completion data stream to the PCI-X device 120*j* via the bus 205*j* (at step 320). Both the PCI-X device 120*i* and the PCI-X bridge 210 are not allowed to disconnect until the next ADB, unless the PCI-X device 120*i* and the PCI-X bridge 210 reaches the end of the split completion data stream (i.e., the byte transfer count becomes exhausted). However, because the byte transfer count starts at 300*d*, the PCI-X device 120*i* and the PCI-X bridge 210 will reach at least the next ADB. As a result, the PCI-X device 120*i* will send at least a block (128 bytes) of split completion data to the PCI-X bridge 210.

Because the bandwidth of the bus 205*i* is the same as or higher than that of the bus 205*j*, for at least the first 128 bytes of split completion data, the PCI-X bridge 210 will not run out of split completion data while forwarding split completion data to the PCI-X device 120*j*. Assume further that the PCI-X device 120*i* sends all 300 bytes of split completion data to the PCI-X bridge 210 in one burst. As a result, the PCI-X bridge 210 forwards the 300 bytes of split completion data to the PCI-X device 120*j* in one burst (at step 320, then step 330 with a result of YES, and then step 340). This is the best case scenario in which the lowest latency and highest efficiency are achieved. The lowest latency is achieved because the PCI-X bridge 210 forwards the split completion data to the PCI-X device 120*j* as soon as the PCI-X bridge 210 receives the first byte of the split completion data from the PCI-X device 120*i*. The highest efficiency is achieved because no bus idling occurs to the PCI-X bus 205*j* while the PCI-X bridge 210 forwards the 300 bytes of split completion data to the PCI-X device 120*j* in one burst via the PCI-X bus 205*j*.

Assume alternatively in the first example that the PCI-X device 120*i* disconnects at the first ADB after sending one block (128 bytes) of split completion data to the PCI-X bridge 210. As a result, the PCI-X bridge 210 also disconnects at the first ADB after immediately forwarding one block (128 bytes) of split completion data from the PCI-X device 120*i* to the PCI-X device 120*j* (at step 320, then step 330 with a result of NO, and then step 310). Assume further that the PCI-X device 120*i* later resumes split completion data transfer where it stopped (i.e., at the beginning of the next block) and sends the remaining split completion data of 172 bytes (300-128) to the PCI-X bridge 210. Because the PCI-X device 120*i* resumes split completion data transfer at the beginning of a block (more specifically, the beginning of the second block from the original start), as soon as the PCI-X bridge 210 receives the first data byte of the resumed transfer, the PCI-X bridge 210 resumes forwarding the remaining split completion data of 172 bytes to the PCI-X device 120j via the PCI-X bus 205j (at step 310 with a result of YES for the first determination, then step 320, then step 330 with a result of YES, and then step 340). As a result, in the first example, the PCI-X bridge 210 forwards split completion data from the PCI-X device 120i to the PCI-X device 120j in bursts of at least the block size (128 bytes).

As a second example illustrating the operation of the PCI-X bridge 210, assume that before sending split completion data to the PCI-X bridge 210, the PCI-X device 120i indicates that it will start at 64 bytes before the beginning of a block and the byte transfer count is 250d (i.e., the PCI-X device 120i will send 250 bytes). Because the PCI-X device 120i does not start at the beginning of a block (at step 310 with results of NO for both the first and second determinations), the PCI-X bridge 210 does not start forwarding split completion data until (a) the PCI-X device 120i sends the data byte at the beginning of the next block to the PCI-X bridge 210 or (b) the byte transfer count is exhausted, which ever occurs first. According to the PCI-X specification, the PCI-X device 120i and the PCI-X bridge 210 can disconnect only at an ADB, unless the byte transfer count is exhausted. Here, the byte transfer count is 250d which is greater than 64. As a result, the PCI-X device 120i may disconnect as early as at the next ADB (i.e., immediately after sending 64 bytes of split completion data to the PCI-X bridge 210).

Assume that the PCI-X device 120i sends all 250 bytes of split completion data to the PCI-X bridge 210 in one burst. Because the PCI-X device 120i does not start at the beginning of a block, the PCI-X bridge 210 does not immediately start forwarding split completion data. When the PCI-X device 120i reaches the beginning of the next block (i.e., the $65^{th}$ byte from the start), the PCI-X bridge 210 starts forwarding split completion data to the PCI-X device 120j (at step 310 with a result of YES for the first determination, and then step 320). Because the bandwidth of the PCI-X bus 205i is the same as or higher than that of the bus 205j, the PCI-X bridge 210 will not run out of split completion data while forwarding split completion data to the PCI-X device 120j. As a result, the PCI-X bridge 210 forwards the 250 bytes of split completion data to the PCI-X device 120j in one burst (at step 320, then step 330 with a result of YES, and then step 340). Here, the highest efficiency is achieved because no bus idling occurs to the PCI-X bus 205j while the PCI-X bridge 210 forwards the 250 bytes of split completion data to the PCI-X device 120j in one burst via the PCI-X bus 205j.

The PCI-X bridge 210 is configured to refrain from immediately forwarding split completion data from the PCI-X device 120i to the PCI-X device 120j because the PCI-X device 120i may or may not stop after sending the 64 bytes and the PCI-X bridge 210 cannot predict whether the PCI-X device 120i will stop after sending the 64 bytes. If, against the rule, the PCI-X bridge 210 immediately starts forwarding split completion data as soon as it receives the first byte of split completion data from the PCI-X device 120i, the lowest latency is achieved. However, if the PCI-X bridge 210 immediately starts forwarding split completion data as soon as it receives the first byte of split completion data from the PCI-X device 120i and the PCI-X device 120i stops after sending the first 64 bytes of split completion data, the PCI-X bridge 210 has to stop (disconnect) after forwarding 64 bytes of split completion data to the PCI-X device 120j. As a result, the PCI-X bridge 210 forwards only 64 bytes in the first burst of data forwarding. This tends to increase the number of bursts of data forwarding and, therefore, increase the bus idling time between these bursts for the PCI-X bus 205j, resulting in low efficiency.

In summary, by waiting until the PCI-X device 120i reaches the beginning of the next block (at step 310 with a result of YES for the first determination), the PCI-X bridge 210 will have at least 128 bytes (more specifically, 64+128=192 bytes) of split completion data to forward to the PCI-X device 120j in the next (and also the first) burst of data forwarding. The reason is that, in general, once the PCI-X device 120i reaches the beginning of the next block, the PCI-X device 120i and the PCI-X bridge 210 will not disconnect until at least the next ADB. As a result, the PCI-X bridge 210 forwards at least 128 bytes in the first burst of data forwarding. This tends to reduce the number of bursts of data forwarding and, therefore, reduce the bus idling time between these bursts for the PCI-X bus 205j, resulting in higher efficiency. In short, the rule sets a balance between the two competing goals of high efficiency and low latency. By delaying the forwarding of the split completion data to ensure that at least 128 bytes of split completion data will be forwarded in the next burst of data forwarding, the PCI-X bridge 210 improves efficiency at the expense of some lower latency with respect to data forwarding over the PCI-X bus 205j.

Assume alternatively in the second example that the PCI-X device 120i disconnects at the first ADB after sending 64 bytes of split completion data to the PCI-X bridge 210. As a result, the PCI-X bridge 210 also disconnects at the first ADB after immediately forwarding 64 bytes of split completion data from the PCI-X device 120i to the PCI-X device 120j (at step 320, then step 330 with a result of NO, and then step 310). Assume further that the PCI-X device 120i later resumes split completion data transfer where it stopped (i.e., at the beginning of the next block) and sends the remaining split completion data of 186 bytes (250–64) to the PCI-X bridge 210. Because the PCI-X device 120i resumes split completion data transfer at the beginning of a block (at step 310 with a result of YES for the first determination), as soon as the PCI-X bridge 210 receives the first data byte of the resumed transfer, the PCI-X bridge 210 resumes forwarding the remaining split completion data of 186 bytes to the PCI-X device 120j via the PCI-X bus 205j (at step 320, then step 330 with a result of YES, and then step 340).

As a third example illustrating the operation of the PCI-X bridge 210, assume that before sending split completion data to the PCI-X bridge 210, the PCI-X device 120i indicates that it will start at 90 bytes before the beginning of a block and the byte transfer count is 60d (i.e., the PCI-X device 120i will send 60 bytes). Because the PCI-X device 120i does not start at the beginning of a block (at step 310 with results of NO for both the first and second determinations), the PCI-X bridge 210 does not start forwarding split completion data until (a) the PCI-X device 120i sends the data byte at the beginning of the next block to the PCI-X bridge 210 or (b) the byte transfer count is exhausted, which ever occurs first. Here, the byte transfer count will be exhausted before the PCI-X device 120i reaches the beginning of the next block. As a result, as soon as the PCI-X device 120i finishes sending 60 bytes of split completion data to the PCI-X bridge 210 (at step 310 with a result of YES for the second determination), the PCI-X bridge 210 starts forwarding the 60 bytes of split completion data to the PCI-X device 120j (at step 320, then step 330 with a result of YES, and then step 340).

In one embodiment, the PCI-X bus 205i includes an IRDY (Initiator Ready) signal which is asserted when the PCI-X device 120i sends the first byte of split completion data to the PCI-X bridge 210. The PCI-X bridge 210 may be configured to assert a forwarding start signal when (a) the IRDY signal is asserted and (b) the PCI-X device 120*i* and the PCI-X bridge 210 reach the beginning of a block. The forwarding start signal is also asserted when the byte transfer count is exhausted. In response to the forwarding start signal being asserted, the PCI-X bridge 210 starts or resumes forwarding to the PCI-X device 120*j* the split completion data it receives from the PCI-X device 120*i*.

In summary, the described embodiments implement a balance between the two competing goals: low latency and high efficiency. In the embodiments, when the PCI-X bridge 210 finds that it will receive at least a block of split completion data from the PCI-X device 120*i* (at step 310 with a result of YES for the first determination), it starts or resumes forwarding split completion data to the PCI-X device 120*j* (at step 320). As a result, this tends to reduce the number of bursts of data forwarding by the PCI-X bridge 210 and, therefore, reduce the bus idling time between these bursts with respect to the PCI-X bus 205*j*, resulting in higher efficiency.

However, when the PCI-X bridge 210 finds that it has received all the split completion data from the PCI-X device 120*i* (i.e., the byte transfer count is exhausted), the PCI-X bridge 210 also starts forwarding split completion data to the PCI-X device 120*j* (at step 310 with a result of YES for the second determination, then step 320, then step 330 with a result of YES, and then step 340). Moreover, the assumption that the bandwidth of the PCI-X bus 205*i* is the same as or higher than that of the bus 205*j* ensures that the PCI-X bridge 210 does not run out of split completion data while forwarding split completion data to the PCI-X device 120*j*. In one embodiment, the bus 205*i* can be a PCI-X bus and the bus 205*j* can be a PCI-X bus or a PCI bus. This ensures that bandwidth of the bus 205*i* is the same as or higher than that of the bus 205*j*. In another embodiment, the PCI-X bus 205*i* can be a Front Side Bus (FSB) and the bus 205*j* can be a PCI-X bus. In general, the buses 205*i* and 205*j* can be any bus, provided that the bandwidth of the bus 205*i* is the same as or higher than that of the bus 205*j*.

Figure 4:
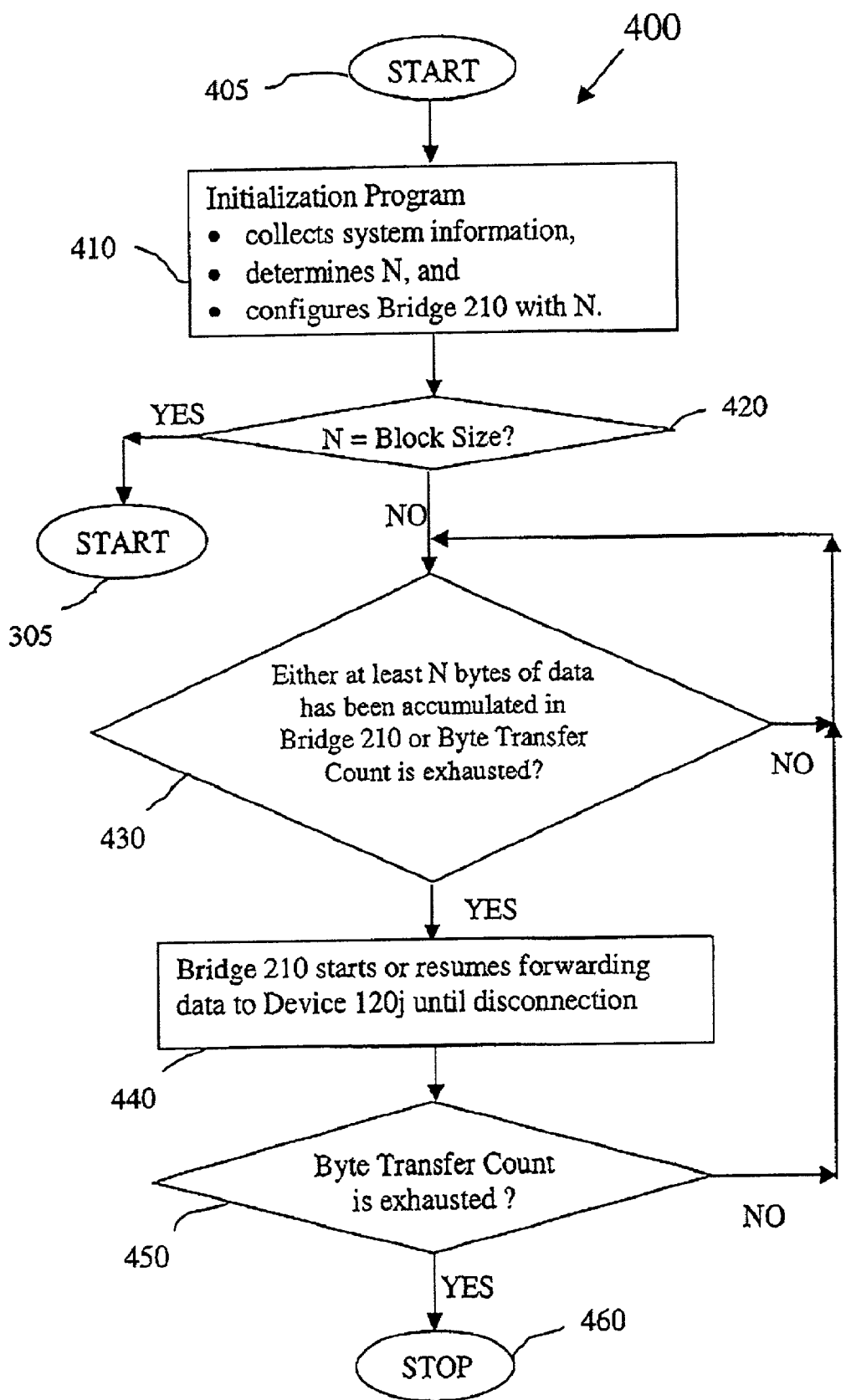
FIG. 4 shows one embodiment of a method of operation 400 of the system 100.

FIG. 4 shows one embodiment of a method of operation 400 of the system 100 in which the bandwidth of the bus 205*i* does not have to be the same as or higher than that of the bus 205*j*. The method 400 starts with a step 410, in which, during system initialization, an initialization program collects system information of the digital system 100. Then, based on the system information of the digital system 100, the initialization program determines a value N and configures the PCI-X bridge 210 with the number N. In general, N can be any positive value not less than the block size. However, N should be a multiple of the block size such as 256, 384, and 512 bytes so as to simplify analysis and ultimately the design. After system initialization, the PCI-X bridge 210 forwards split completion data from the PCI-X bus 205*i* to the PCI-X bus 205*j* according to the number N. More specifically, in a step 420, if N is the block size, the PCI-X bridge 210 forwards completion data from the PCI-X device 120*i* to the PCI-X device 120*j* according to the above mentioned rule (go to step 305 of FIG. 3). That is the PCI-X bridge 210 immediately starts or resumes forwarding split completion data to the PCI-X device 120*j* if the PCI-X device 120*i* starts or resumes transfer at the beginning of a block (i.e., the start or resume byte address has the form of 128N). If the PCI-X device 120*i* starts transfer not at the beginning of a block, the PCI-X bridge 210 refrains from forwarding split completion data until (a) the PCI-X device 120*i* sends the data byte at the beginning of the next block to the PCI-X bridge 210 or (b) the byte transfer count is exhausted, whichever occurs first.

If N is not the block size (e.g., 256, 384, 512 bytes), the PCI-X bridge 210 starts or resumes forwarding split completion data to the PCI-X device 120*j* when either (a) the PCI-X bridge 210 has accumulated at least N bytes of split completion data in its buffer 240*a* from the PCI-X device 120*i* or (b) the PCI-X bridge 210 has reached the end of the split completion data stream (i.e., the byte transfer count is exhausted), whichever occurs first (at steps 430, 440, 450, and 460). More specifically, in the step 430, while the PCI-X bridge 210 is receiving split completion data from the PCI-X device 120*i*, a fourth determination is made as to whether the PCI-X bridge 210 has accumulated at least N bytes of split completion data from the PCI-X device 120*i* in its buffer 240*a*. Also in the step 430, a fifth determination is made as to whether the byte transfer count for the data transfer between the PCI-X device 120*i* and the PCI-X bridge 210 is exhausted. If both the fourth and fifth determinations yield negative (NO) results, the step 430 is repeated. If either the fourth or fifth determination yields positive (YES) result, in a step 440, the PCI-X bridge 210 starts forwarding split completion data from the PCI-X device 120*i* to the PCI-X device 120*j* until a disconnection occurs between the PCI-X bridge 210 and the PCI-X device 120*j*. The method 400 continues with a step 450 in which a sixth determination is made as to whether the byte transfer count for the data transfer between the PCI-X bridge 210 and the PCI-X device 120*j* is exhausted. If so, the split completion data transfer between the PCI-X bridge 210 and the PCI-X device 120*j* is complete in a step 460. If not, the disconnection in the step 440 is a disconnection at an ADB and is a result of a disconnection at an ADB in the data transfer between the PCI-X device 120*i* and the PCI-X bridge 210. As a result, the step 430 is repeated with the fourth and fifth determinations.

It is understood that the invention is applicable even if the PCI-X bus specification changes with respect to the block size. Thus, it is contemplated that in some systems, the block size may be other than 128 bytes.

In one embodiment, the initialization program, during initialization, may collect such information as the operating frequency and the width of the PCI-X buses 205*i* and 205*j* and the sizes of the buffers 240*a*, 240*i*, and 240*j*. Based on the collected information, the initialization program determines the number N used to configure the PCI-X bridge 210.

While the foregoing is directed to embodiments of the present invention, other and further embodiments of the invention may be devised without departing from the basic scope thereof, and the scope thereof is determined by the claims that follow.

What is claimed is:

1. A method for transferring data in a digital system comprising a first bus, a second bus, and a bridge coupling the first and second buses, the first bus having the same or higher bandwidth than that of the second bus, the method comprising:

receiving data transferred from the first bus to the bridge;

determining, with the bridge, whether at least one of the following conditions has been met: 1) the data transferred from the first bus to the bridge has reached the beginning of a data block or 2) the data transferred from the first bus to the bridge has reached a predetermined byte transfer count if at least one of the conditions is satisfied, forwarding to the second bus, with the bridge, at least a portion of the data transferred from the first bus; and if neither of the conditions is satisfied, refraining from forwarding data transferred from the first bus to the second bus.

2. The method of claim 1, further comprising:
determining, with the bridge, whether the bridge has received all the data from the first bus; and
forwarding to the second bus, with the bridge, the data transferred from the first bus in response to the bridge determining that the bridge has received all the data from the first bus.

3. The method of claim 1, wherein the predetermined byte transfer count corresponds to a block size, and determining, with the bridge, whether the bridge has received the predetermined byte transfer count from the first bus comprises determining, with the bridge, whether the transfer of data from the first bus to the bridge reaches the beginning of a block.

4. The method of claim 1, further comprising resuming data forwarding, with the bridge, from the first bus to the second bus in response to the resumption of data transfer from the first bus to the bridge after a disconnect at a block boundary, if any.

5. The method of claim 2, wherein determining, with the bridge, whether the bridge has received all the data from the first bus comprises determining, with the bridge, whether the byte transfer count is exhausted.

6. The method of claim 2, wherein
the predetermined byte transfer count corresponds to a block size, and
determining, with the bridge, whether the bridge has received the predetermined byte transfer count from the first bus comprises determining, with the bridge, whether the transfer of data from the first bus to the bridge reaches the beginning of a block.

7. The method of claim 5, wherein
the predetermined byte transfer count corresponds to a block size, and
determining, with the bridge, whether the bridge has received the predetermined byte transfer count from the first bus comprises determining, with the bridge, whether the transfer of data from the first bus to the bridge reaches the beginning of a block.

8. The method of claim 3, further comprising resuming data forwarding, with the bridge, from the first bus to the second bus in response to the resumption of data transfer from the first bus to the bridge after a disconnect at a block boundary, if any.

9. The method of claim 6, further comprising resuming data forwarding, with the bridge, from the first bus to the second bus in response to the resumption of data transfer from the first bus to the bridge after a disconnect at a block boundary, if any.

10. The method of claim 7, further comprising resuming data forwarding, with the bridge, from the first bus to the second bus in response to the resumption of data transfer from the first bus to the bridge after a disconnect at a block boundary, if any.

11. A digital system, comprising a first bus, a second bus, and a bridge coupling the first and second buses, the first bus having the same or higher bandwidth than that of the second bus, wherein
a first device is configured to transfer data from the first bus to the bridge;
the bridge is configured to determine whether at least one of the following conditions has been met: 1) the data transferred from the first bus to the bridge has reached the beginning of a data block or 2) the data transferred from the first bus to the bridge has reached a predetermined byte transfer count;
the bridge is further configured to forward data from the first bus to the second bus in response to determining at least one of the conditions has been met; and
the bridge is further configured to refrain from forwarding data from the first bus to the second bus in response to determining none of the conditions has been met.

12. The system of claim 11, wherein the bridge is further configured to determine whether the bridge has received all the data from the first bus; and
forward the data from the first bus to the second bus in response to the bridge determining that the bridge has received all the data from the first bus.

13. The system of claim 11, wherein
the predetermined byte transfer count corresponds to a block size, and
determining, with the bridge, whether the bridge has received the predetermined byte transfer count from the first bus comprises determining, with the bridge, whether the transfer of data from the first bus to the bridge reaches the beginning of a block.

14. The system of claim 11, wherein the bridge is further configured to resume data forwarding from the first bus to the second bus in response to the resumption of data transfer from the first bus to the bridge after a disconnect at a block boundary, if any.

15. The system of claim 12, wherein the bridge is further configured to determine whether the byte transfer count is exhausted to determine whether the bridge has received all the data from the first bus.

16. The system of claim 12, wherein
the predetermined byte transfer count corresponds to a block size, and
determining, with the bridge, whether the bridge has received the predetermined byte transfer count from the first bus comprises determining, with the bridge, whether the transfer of data from the first bus to the bridge reaches the beginning of a block.

17. The system of claim 13, wherein the bridge is further configured to resume data forwarding from the first bus to the second bus in response to the resumption of data transfer from the first bus to the bridge after a disconnect at a block boundary, if any.

18. The system of claim 15, wherein
the predetermined byte transfer count corresponds to a block size, and
determining, with the bridge, whether the bridge has received the predetermined byte transfer count from the first bus comprises determining, with the bridge, whether the transfer of data from the first bus to the bridge reaches the beginning of a block.

19. The system of claim 16, wherein the bridge is further configured to resume data forwarding from the first bus to the second bus in response to the resumption of data transfer from the first bus to the bridge after a disconnect at a block boundary, if any.

20. The system of claim 18, wherein the bridge is further configured to resume data forwarding from the first bus to the second bus in response to the resumption of data transfer from the first bus to the bridge after a disconnect at a block boundary, if any.

21. A method for transferring data in a digital system comprising a first bus, a second bus, and a bridge coupling the first and second buses, wherein address space of the digital system is divided into blocks having block size, the method comprising:
- configuring the bridge with positive integer N, N being at least the block size and determined based on system information of the digital system;
- if N is the block size, determining, with the bridge, whether the transfer of data from the first bus to the bridge reaches the beginning of a block while receiving data from the first bus by the bridge; and
- forwarding, with the bridge, data from the first bus to the second bus in response to the bridge determining that the transfer of data from the first bus to the bridge reaches the beginning of a block.

22. The method of claim 21, further comprising:
- determining, with the bridge, whether the bridge has received all the data from the first bus; and
- forwarding, with the bridge, the data from the first bus to the second bus in response to the bridge determining that the bridge has received all the data from the first bus.

23. The method of claim 22, wherein determining, with the bridge, whether the bridge has received all the data from the first bus comprises determining, with the bridge, whether a predetermined byte transfer count is exhausted.

* * * * *